United States Patent [19]

Simmons et al.

[11] 3,801,958

[45] Apr. 2, 1974

[54] DATA ACQUISITION INTERFACE

[75] Inventors: Richard W. Simmons; Stanley A. Berry, both of Ann Arbor, Mich.

[73] Assignee: The Bendix Corporation, Southfield, Mich.

[22] Filed: Oct. 2, 1972

[21] Appl. No.: 294,427

[52] U.S. Cl. .............................. 340/147 G, 340/176

[51] Int. Cl. .............................................. H04q 9/00

[58] Field of Search .... 340/147 R, 150, 176, 147 P, 340/147 G, 147 T, 166 R

[56] References Cited

UNITED STATES PATENTS

| | | | |
|---|---|---|---|
| 3,201,754 | 8/1965 | Reiner et al. | 340/176 X |
| 3,225,331 | 12/1965 | Steeneck | 340/176 X |
| 3,402,404 | 9/1968 | Burley et al. | 340/176 |
| 3,444,518 | 5/1969 | Greene | 340/147 R |
| 3,719,925 | 3/1973 | Vinch | 340/147 P |

*Primary Examiner*—Donald J. Yusko
*Attorney, Agent, or Firm*—Lester L. Hallacher

[57] ABSTRACT

A data acquisition interface unit for interconnecting hard contact switches and other similar binary data sources to a data receiving station, such as a digital computer. The interface comprises a panel having data source input terminals organized into word groups of several bits each and an address terminal and common terminal for each word. Address selection means are provided for connecting the common terminal of each word to system ground in a sequential fashion thereby to systemmatically transfer data from each of the word groups to the data receiving station. Isolator diodes are connected in a hard-wired data communication path so as to prevent data errors arising out of the existence of several closed switches in a nonaddressed word.

4 Claims, 3 Drawing Figures

DATA ACQUISITION INTERFACE

INTRODUCTION

This invention relates to binary data acquisition systems and more particularly to an interface unit which is usable for communicating binary data in an organized fashion from a plurality of data sources, such as hard contact switches, to a data receiving station, such as a digital computer.

BACKGROUND OF THE INVENTION

It is often desirable to monitor an industrial operation or some phase thereof by monitoring the performance of certain machines and other apparatus. This is customarily carried out by installing hard contact signal sources, such as Micro-switches and the like, at various locations such that each switch changes between open circuit and closed circuit conditions in such a fashion such as to effectively represent the operation of the apparatus being monitored. An industrial operation of any complexity requires a large number of such data sources and, accordingly, it is desirable to communicate these sources with a data receiving station, such as a computer or display panel, in an organized fashion.

One way to accomplish such a connection between the data sources and the data receiving station is simply to connect each data source to a separate data receiving device. This approach has the disadvantage of requiring a large number of conductors between the monitoring area and the data receiving station and, in addition, absorbs a great deal of data input capacity at the data receiving station; i.e., if the data receiving station has 64 input terminals for sixty-four bits of data and there are 64 data source switches, the one-for-one connection scheme utilizes all of the data input terminals. Accordingly, it is preferable to organize the data sources into a plurality of bit groups, hereinafter called words or word groups, and to sequentially input data from the word groups to the data receiving station in an organized fashion.

BRIEF STATEMENT OF THE INVENTION

In accordance with the present invention, binary data sources, such as hard contact switches and the like, are organized for connection to data receiving means, such as a display panel or the storage facility of a digital computer, in such a fashion as to define a plurality of separately addressable word groups each having several data sources therein. Accordingly, the content of the binary data sources may be readily and straightforwardly determined by sequentially selecting the addresses of each of the addressable word groups thereby to input the contents of each of the data sources in each word group to the data receiving station in an organized fashion. This has the advantages of dramatically reducing the number of individual conductors required as well as the extent of data input utilization at the receiving station.

In general, the objectives of the present invention are accomplished by organizing the data sources into word groups each comprising a plurality of individual sources representing individual data bits and connecting a receiving station to the individual word groups by means of address lines and address selection means. In addition, the individual data sources are connected by way of a hard-wired connection to the data receiving station, the number of conductors in this hard-wired connection being equal to the maximum number of bits in a word group; i.e., one conductor carries the first bit of each word group, another conductor carries the second bit of each word group, and so forth. While a hard-wired connection between the data sources and the data receiving station exists, this hard-wired connection represents only one-half of a data communication path, the other half being accomplished on a selective basis for each word group by way of the address selection means.

In accordance with a further feature of the invention, the possibility of erroneous data transfers arising out of the existence of two or more data sources in a closed switch condition and residing in a nonselected word group is eliminated through the use of isolating diodes or the like connected in series with each of the data sources so as to permit data transfer current to flow only in one direction. This has the effect of eliminating the possibility of a current flow from one hard-wired conductor to another hard-wired conductor by way of the two closed-switch data sources in the nonselected word.

In accordance with a further feature of the invention, a conveniently connected and programmed interface unit is provided whereby a plurality of data sources, such as two-terminal, hard-contact switches, may be readily connected into a terminal panel so as to be organized into word groups and whereby the individual word groups may be addressed for data transfer. This is accomplished by providing a support means in the form of a panel having a plurality of terminal groups including data input terminals, address input terminals, and data output terminals.

The various features and advantages of the invention will be best understood from a reading of the following specification which describes a specific and illustrative embodiment of the invention in detail.

DETAILED DESCRIPTION OF THE SPECIFIC EMBODIMENT

Figures 1, 2, 3:
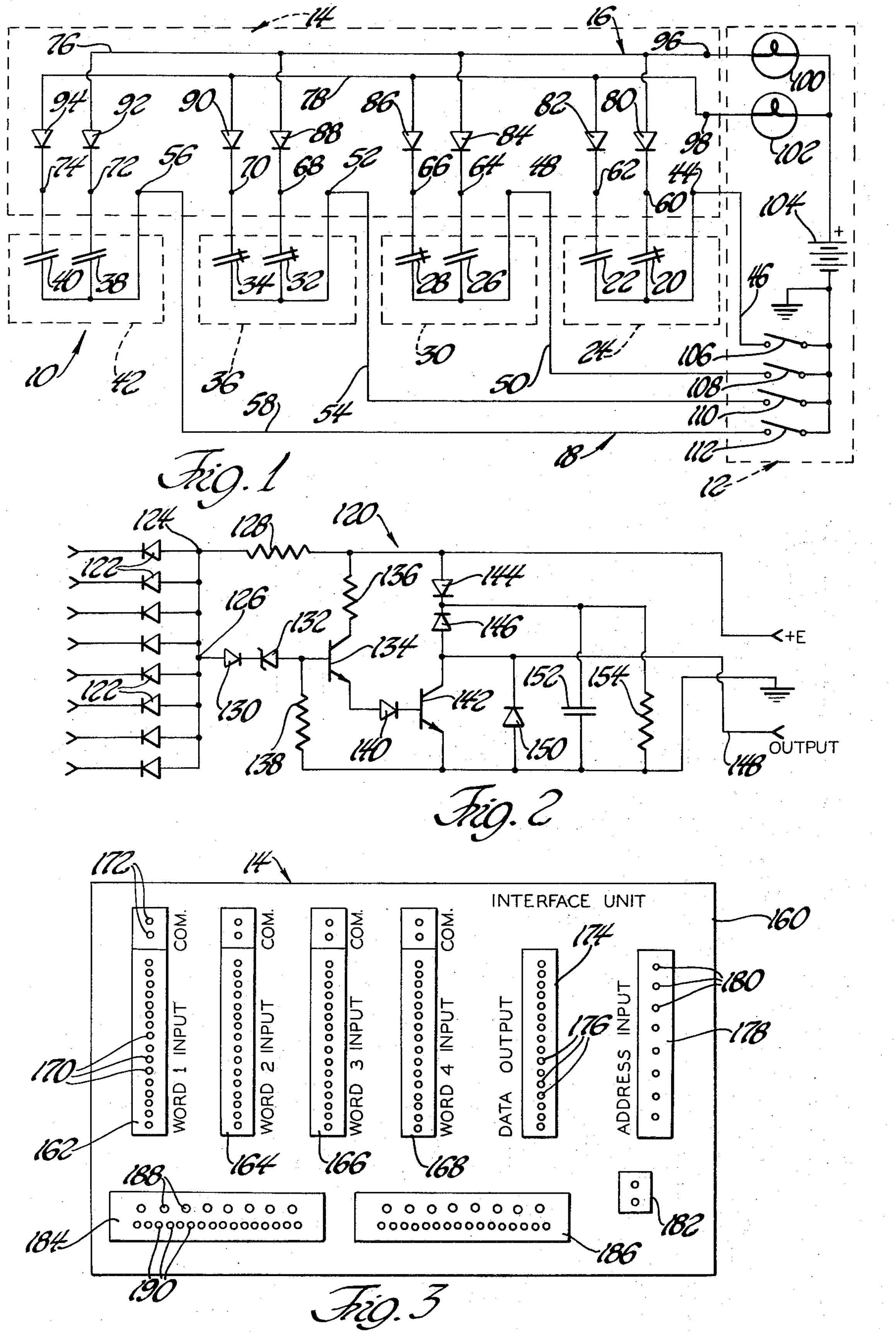
FIG. 1 is a schematic circuit diagram of a simplified, but illustrative, embodiment of the invention.
FIG. 2 is a schematic circuit diagram of an address decoder which is usable in connection with the invention; and, FIG. 3 is a front view of a support panel for the various terminals of an interface unit by which to carry out the invention in a practical application.

Referring now to FIG. 1, the data acquisition system thereshown operates to communicate the condition of each of a group of eight binary data sources in the form of hard contact switches 10 to a remote display and control unit 12 by means of an isolated contact interface unit 14. In accordance with the invention, the interface unit 14 is interconnected with the remote display and control unit 12 by means of a hard-wired two-conductor data cable 16 and an address cable 18 having four address lines which are individually selectively addressable for data transfer purposes.

Describing the circuit of FIG. 1 in greater detail, it can be seen that the eight switches 10 are grouped into four words of two switches each. More specifically, switches 20 and 22 are grouped together to form word 24, switches 26 and 28 are grouped together to form word 30, switches 32 and 34 are grouped together to form word 36, and switches 38 and 40 are grouped together to form word 42. This organization is arbitrarily selected for illustrative purposes, it being understood that any word grouping can be employed subject, of course, to the specific hardware requirements of any given application. It is preferred, however, to have as nearly equal a number of switches or bits in each of the word groups as is possible.

One contact of each of the switches 20 and 22 in word group 24 is connected commonly to the common terminal 44 which is carried by the interface unit 14. Common terminal 44 is in turn connected to address line 46 which extends between the interface unit 14 and the remote display and control unit 12. Similarly, one contact of each of switches 26 and 28 in the second word group 30 is connected commonly to the common terminal 48. This terminal is in turn connected to address line 50 which extends between the interface unit 14 and the remote display and control unit 12. In a like fashion, one contact of each of switches 32 and 34 is connected commonly to common terminal 52 and this terminal is connected by way of address line 54 to the remote display and control unit 12. Finally, one contact of each of switches 38 and 40 is connected commonly to the common terminal 56 and this terminal is connected by way of address line 58 to the remote display and control unit 12. Accordingly, each switch-bit shares a single address line with the other switch-bits in a given word group and is commonly connected to that address line by way of a common terminal which is conveniently disposed on the interface unit 14 in such a fashion as to identify with a particular word. The address line connection operates to form part of a data communication path for the bits of a given word when the address of that word is properly selected.

The interface unit 14 further comprises input terminals 60, 62, 64, 66, 68, 70, 72, and 74 which are grouped, two terminals to a group, to match the words 24, 30, 36, and 42 of switches 10. Accordingly, the second or upper contact of switch 20 as seen in FIG. 1 is connected to input terminal 60 and the second or upper terminal of switch 22 is connected to input terminal 62. Similarly, the upper contacts of switches 26 and 28 are connected to input terminal 64 and 66, the upper contacts of switches 32 and 34 are connected to input terminal 68 and 70 and the upper contacts of switches 38 and 40 are connected to input terminals 72 and 74. These input terminals are further connected to the remote display and control unit 12 by means of a hard-wired connection to form the other half of the data communication paths as hereinafter described.

Referring still to FIG. 1, the interface unit 14 is shown to comprise a pair of data line conductors 76 and 78 and a group of eight diodes 80, 82, 84, 86, 88, 90, 92, and 94. The righthandmost switches 20, 26, 32, and 38 of the word groups 24, 30, 36, and 42 respectively, are all connected to data line conductor 76. Thse connections are effected by means of diodes 80, 84, 88, and 92 as well as the associated input terminals 60, 64, 68, and 72, respectively. In addition, the left-hand bit switch in each of the word groups 24, 30, 36, and 42 is connected to the data line conductor 78 by means of isolator diodes 82, 86, 90, and 94, respectively. Accordingly, there are as many data line conductors (76, 78) in the data cable 16 as there are bits per word group and each of the data line conductors is connected to a specific bit in each of the word groups 24, 30, 36, and 42. The data line conductor 76 is conveniently connected to an output terminal 96 which forms an integral part of the interface unit 14. Similarly, the data line conductor 78 is preferably connected to a terminal 98 for convenient connection to the data cable 16. The diodes 80, 82, 84, 86, 88, 90, 92, and 94 are all preferably permanently mounted on a support panel which forms part of the interface unit 14 and permanently connected between the terminals 96, 98 and the input terminals 60, 62, 64, 66, 68, 70, 72, and 74.

Looking now to the remote display and control unit 12, it can be seen that each of the conductors in the data cable 16 is connected to one of the two data display lights 100 and 102. Accordingly, the condition of display light 100 represents the condition of the switch on the right side of the selected word group as seen in FIG. 1 and display light 102 represents the condition of the switch on the left side of the selected word group as seen in FIG. 1. It is to be understood that the display lights 100 and 102 are merely representative of the many binary data receiving devices which can be employed, these selections including, among others, magnetic storage elements of a digital computer memory unit. Remote display and control unit 12 further comprises a dc voltage source in the form of a battery 104 having the positive terminal connected commonly to one side of the lights 100 and 102. Display and control unit 12 further comprises four word select address switches 106, 108, 100, and 112. One side of each of the switches 106, 108, 110, and 112 is connected commonly to the negative or ground side of the battery 104. The other side of switch 106 is connected by way of address line 46 to the common terminal 44 of word 24. The other side of switch 108 is connected by way of address line 50 to the common terminal 48 of word 30. The other side of switch 110 is connected by way of address line 54 to the common terminal 52 of word 36 and the other side of switch 112 is connected by way of address line 58 to the common terminal 56 of word 42.

Describing now the operation of the circuit of FIG. 1, it is first assumed that the switches 10 have the following conditions at the time data is communicated from the switch group to the remote display and control unit 12: switch 20 closed; switch 22 open; switch 26 open; switch 28 closed; switch 32 closed; switch 34 closed; switch 38 open; switch 40 open. It is further assumed that means are provided for closing the address selection switches 106, 108, 110, and 112 in series, no two switches in the address selection switch group being closed at any one time.

Assuming switch 106 is closed, first, the negative terminal of battery 104, which operates as system ground, is connected commonly to the lower side of each of switches 20 and 22 by way of address line 46 and the common terminal 44. Data cable 16 forms the second half of the data communication path by connecting the positive terminal of battery 104 to the other side of switches 20 and 22 through the bit display lights 100 and 102 and the diodes 80 and 82, respectively. Under these conditions, a current path is completed through display light 100, diode 80, and switch 20 causing light 100 to light. However, the open condition of switch 22 prevents any flow of current through display light 102 leaving that light in the unlighted condition. Accordingly, closing switch 106 indicates a bit condition "10" for word 24. Switch 106 is then opened and swigch 108 is closed to read the contents "01" of word 30. Switches 110 and 112 are then closed in sequence to read the content of words 36 and 42 as "11" and "00", respectively.

An important feature of the present invention is the isolator diodes 80, 82, 84, 86, 88, 90, 92, and 94 which operate to prevent a data error from arising out of the fact that word 36 contains two closed switches 32 and 34. Assuming the diodes were not present and that short circuits were substituted therefor, it can be seen that the closure of switch 106 to read the contents of word 24 would produce an error. This error results from the fact that a current path exists not only through display light 100 by virtue of the closed condition of switch 20, but also through display light 102 by virtue of the closed condition of switches 32 and 34. By way of further explanation, it can be seen that a current path would exist in the absence of the diodes 88 and 90 from the positive terminal of battery 104 through light 102, through switch 34, through switch 32 to conductor 76, and thence through closed switch 20 to the ground or negative side of battery 104. This would erroneously indicate a closed condition for switch 22. Accordingly, the unidirectionally conducting diodes connected between the input terminals and the data conductors operate to prevent such erroneous readings.

It will be understood that the address selection switches 106, 108, 110, and 112 of FIG. 1 are merely representative of one implementation of an address selection function, and that in the typical installation a more sophisticated electronic approach may be employed. FIG. 2 illustrates an address selection switch circuit 120 which operates in the fashion of an inverting AND gate having an eight-bit address and which may be substituted for each of the switches in the address selection apparatus of FIG. 1.

Circuit 120 has eight input address terminals connected to the cathode electrodes of parallel connected diodes 122. The diodes having the anode electrodes thereof commonly connected to terminals 124 and 126 of which terminal 124 is connected to a 48 volt dc source through a large resistor 128. Terminal 126 operates as a summing junction and is connected through diode 130 and Zener diode 132 to the base of a control transistor 134. Transistor 134 is of the NPN type and has the collector electrode connected through resistor 136 to the 48 volt dc supply. The base electrode of transistor 134 is connected through a resistor 138 to the system ground as shown. The emitter electrode of transistor 134 is connected through diode 140 to the base of transistor 142 which operates as the output switch. The emitter of transistor 142 is connected to ground as shown. The collector electrode of transistor 142 is connected directly to an output terminal 148 and also through common-cathode diodes 146 and 144 to the positive supply. The common-cathode junction of the diodes 144 and 146 is connected to ground through parallel-connected capcitor 152 and resistor 154. Diode 150 is connected across the collector-to-emitter terminals of transistor 142. It can be seen that when transistors 134 and 142 are rendered conductive by an eight-bit input address, terminal 148 is short circuited to system ground through transistor 142. Output terminal 148 is accordingly connected to whichever of the common ground terminals 44, 48, 52, and 56 to be operated by the switch circuit 120 for word group selection.

Looking now to FIG. 3, a preferred implementation of the interface unit 14 generally described with reference to FIG. 1 is shown. Interface unit 14 comprises terminal support means in the form of a panel 160 of the type adapted to be disposed in a vertical plane as the face plate of a typical electronics cabinet. Panel 160 carries plug-in terminal strips 162, 164, 166, and 168 representing the input terminals for four eight-bit words or word groups; that is, the terminal strips 162, 164, 166, and 168 accommodate a total of 64 binary data sources. One terminal of each of the hard contact data source switches is plugged into a terminal 170, for example, and thereby organized into the four sixteen-bit words as shown. Terminal strip 162 further incudes a pair of commonly connected plug-in type common terminals 172 which correspond to the common terminal 44 in FIG. 1. Terminal strips 164, 166, and 168 are similarly arranged.

Panel 160 further inclues terminal strip 174 having sixteen plug-in terminals 176 representing the 16-bit data output facility. These terminals 176 are adapted to receive plug-in type connectors for transferring the 16 bits of data from each of the four word groups to a remote display and control unit, such as 12 in FIG. 1, and preferably of the type having data storage facility. Panel 160 further comprises an address input terminal strip 178 having plug-in type terminals 180 adapted to receive the address lines which correspond to address lines 46, 50, 54, and 58 in FIG. 1. Address selection switches of the type shown in FIG. 2 are employed in connection with the lines to be plugged into the address input terminals 180.

A dc power input terminal strip 182 is provided for the connection of dc power to the panel 160.

Address encoder strips 184 and 186 are also provided for determining the specific eight-bit addresses of the four data word groups. FIG. 3 shows only two address encoder terminal strips whereas it is to be understood that four such strips are employed, one for each of the four data word groups. The deletion in FIG. 3 is made for the sake of saving space. Each of the terminal strips, of which terminal strip 184 is representative, comprises eight address terminals 188 and 16 bit selection terminals 190; i.e., two bit selection terminals for each address terminal 188. The terminals 188 and 190 are prewired so that a simple U-shaped plug-in type jumper may be inserted into each of the terminals 188 and into either the "one" or "zero" bit selection terminal 190 associated therewith to establish an eight-bit address for each of the four data words.

Panel 160 is preferably constructed so as to carry the isolator diodes corrresponding to diodes 80, 82, 84, 86, 88, 90, 92, and 94 of FIG. 1 on the reverse side thereof in a hard-wired fashion.

It is to be understood that the foregoing description is illustrative in character and that the particular selection of hardware as well as the selection of word groups and numbers of data bits is illustrative in nature and is not to be construed in a limiting sense.

The embodiments of the invention in which an exclusive property of privilege is claimed are defined as follows:

1. A data acquisition system for communicating the condition of each of a number of hard contact switches to a smaller number of binary data receiving devices comprising: a plurality of hard contact switches, each capable of open and closed circuit conditions, and a remote addressing and indicating unit including a plurality of binary data receiving devices fewer in number than said hard contact switches, conductive means commonly electrically connecting one contact of each switch in a first plurality of switches to a first common terminal to define a first switch word group, additional conductive means commonly electrically connecting one contact of each switch in a second plurality of switches to a second common terminal to define a second switch word group, means in said remote unit defining a plurality of selectively closeable address switches, each address switch in said plurality of selectively closeable address switches corresponding to an individual common terminal, means connecting one side of respective address switches to said first and second common terminals, means connecting the other side of said address switches to a point of reference potential, a plurality of data line conductors equal in number to the maximum number of switches in any word group and connecting said switchs with said receiving devices such that a selected switch in every word group is directly connected to a respective receiving device in said plurality of receiving devices, a plurality of diodes, respective diodes in said plurality of diodes being connected between each of said switches and the associated one of said data lines and according to a uniform conductivity convention to preclude the establishment of a conductive path from one data line to another through any two switches in a word group when such two switches are both in a closed circuit condition, a source of electrical potential at said remote unit and connected between said point of reference potential and receiving devices for energization of said devices through said diodes and switches in accordance with the state of said address switches and said hard contact switches in the word group addressed.

2. A data acquisition as defined in claim 1 wherein each of said address switches comprises a transistor control circuit having first and second transistors and first and second output terminals, one of said output terminals being connected to said point of reference potential and the other output terminal being connected to a common terminal of a word group, the first transistor having primary electrodes connected across said output terminals and operative as a current switch between the output terminals so as to connect to said point of reference potential the common terminal of a word group when conductive, the second transistor having primary electrodes connected between a source of electrical potential and the input control terminal of the first transistor so as to apply a bias thereto when conductive, and address input means connected to the input control terminal of the second transistor to control the conductivity thereof in accordance with an input address quantity which is unique to the address switch.

3. A data acquisition system as defined by claim 1 wherein the system further comprises an interface unit having a support panel, said diodes being carried by said support panel, said common terminal of said word groups being supported by said support panel, at least one terminal strip comprising a plurality of termial plugs and removably conductively connected between said address switches and said common terminals, a second terminal strip carried by said support board and including a plurality of terminal plugs removably conductively connected between said data line conductors and said receiving means and a plurality of third terminal strips each comprising a plurality of plug-in terminals removably conductively connected between said hard contact switches and said diodes.

4. A data acquisition system as defined by claim 1 wherein said data receiving means are indicator lamps.

* * * * *